United States Patent [19]
Ikeda

[11] Patent Number: 5,775,177
[45] Date of Patent: Jul. 7, 1998

[54] OIL PUMP COVER

[75] Inventor: Yoichi Ikeda, Fuji, Japan

[73] Assignee: Jatco Corporation, Japan

[21] Appl. No.: 627,113

[22] Filed: Apr. 3, 1996

[30] Foreign Application Priority Data

Apr. 7, 1995 [JP] Japan ................... 7-082291

[51] Int. Cl.$^6$ ................................................ F16H 57/02
[52] U.S. Cl. ................................................ 74/606 R
[58] Field of Search .......................... 74/606 R, 421 A, 74/421 R; 475/116, 159, 131, 246; 192/85 AA, 85 R, 115, 3.21, 3.29

[56] References Cited

U.S. PATENT DOCUMENTS

| | | | |
|---|---|---|---|
| 4,693,353 | 9/1987 | Kobayashi et al. | 192/85 AA |
| 4,982,826 | 1/1991 | Holbrook | 192/106 F |
| 5,388,679 | 2/1995 | Inoue et al. | 192/35 |
| 5,483,850 | 1/1996 | Yamauchi | 192/85 AA |
| 5,515,747 | 5/1996 | Okada et al. | 475/159 |
| 5,577,421 | 11/1996 | Kim | 74/606 R |

*Primary Examiner*—Vinh T. Luong
*Attorney, Agent, or Firm*—Rossi & Associates

[57] ABSTRACT

A cover body formed with AC2B is fixed to a casing of an automatic transmission and has a hole in the shaft center thereof. The cover body is subjected over the surface of the hole to a solution heat treatment at 500 centigrade degree for 3 hours and is tempered at 180 centigrade degree fo 4 hours to acquire hardness of 90 HB of more. An iron stator shaft for supporting a stator of a torque converter is pressed into the hole in the cover body.

Since the plastic deformation of the hole part of the cover body is reduced, the interference between the stator shaft and the cover body is ensured, and the stator shaft is prevented from being displaced axially even at a high temperature.

2 Claims, 2 Drawing Sheets

| | Material | Heat Treatment Condition | Hardness |
|---|---|---|---|
| A | AC2B | Solution heat treatment 500°C x 3HR<br>Tempering 180°C x 4HR | 94~99 HB |
| B | AC4B | Solution heat treatment 525°C x 6HR<br>Tempering 160°C x 6HR | 74~84 HB |
| C | AC2B | No treatment | 68~69.5 HB |

OIL PUMP COVER

BACKGROUND OF THE INVENTION

1. Field of the Invention

The present invention relates to an oil pump cover of an automatic transmission.

2. Description of the Prior Art

There is known as one of conventional oil pump covers that disclosed in the Japanese Utility Model Application Laid-open No.1-140062.

An oil pump cover disclosed therein is constructed such that a stator shaft for supporting a stator of a torque converter is pressed into a hole formed in a pump body part(cover body) for covering an oil pump and is retained not to be moved axially. The pump body part serves chiefly as a cover for sealing the oil pump, and is configured into a large-sized disk and is formed with non-ferrous metal material (usually aluminum) for lightening. In contrast, the stator shaft is usually formed with an iron material that is strong against torsion and bending because it should be configured into a small diameter and a thin wall for the purpose of supporting the stator of the torque converter, though it is subjected to greater torsion and bending force.

The conventional oil pump cover however has the following difficulty: When a vehicle is running the stator shaft is subjected to torsion and bending force owing to the reaction of the stator. Further, when the vehicle is running an automatic transmission becomes high temperature so that there is caused a difference between the thermal expansion of the pump body part and that of the stator shaft owing to a difference between thermal expansion coefficients of materials of the pump body part and the stator shaft. The stator shaft is accordingly sometimes shifted in the direction where it slips out of the pump body part owing to a load applied on the stator shaft. In order to prevent this it is necessary to more increase interference of press fitting between the stator shaft and the pump body part than those of press fitting between members comprising the same material when the stator shaft is pressed into the hole in the pump body part considering a fact that the interference is reduced at high temperature. For this, the hole in the pump body part is superheated and the stator shaft is supercooled for the press fitting therebetween, as a result a manufacturing process is complicated.

SUMMARY OF THE INVENTION

In view of the drawbacks with the prior art, it is an object of the present invention to provide an oil pump cover wherein after the surface of a hole part in the cover body is hardened the stator shaft is pressed thereinto.

An oil pump cover according to the present invention comprises an aluminum cover body fixed to a casing of an automatic transmission and having a hole in a shaft center, an iron stator shaft for supporting a stator of a torque converter, the iron stator shaft being pressed into said hole in said cover body, the improvement being such that said stator shaft is pressed into said cover body after the surface of said hole in said cover body is hardened.

In accordance with this aspect of the present invention plastic deformation of the cover body is reduced when the stator shaft is pressed into the cover body to hereby prevent an actual interference from being reduced, whereby a necessary press interference is ensured even at a high temperature to substantially prevent the stator shaft from being displaced axially. It is therefore unnecessary when the stator shaft is pressed into the hole in the cover body to increase a interference allowance of the pressing of the stator shaft into the cover body taking reduction of the interference at high temperature into consideration. A manufacturing process can therefore be simplified.

By especially setting hardness of the hole in the cover body to 90 HB(Brinell hardness) or more, the plastic deformation of the cover body when the stator shaft is pressed into the cover body is reduced, so that a predetermined amount or more of the interference between the stator shaft and the cover body is secured even at a high temperature.

Further, it is preferable to form the cover body with AC2B and subjecting the surface of the hole to a solution heat treatment at the temperature of 500 centigrade degree for 3 hours and temper it at the temperature of 180 centigrade degree for 4 hours. The hole in the cover body hereby acquires the hardness of 90 HB or more to reduce the plastic deformation of the cover body.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
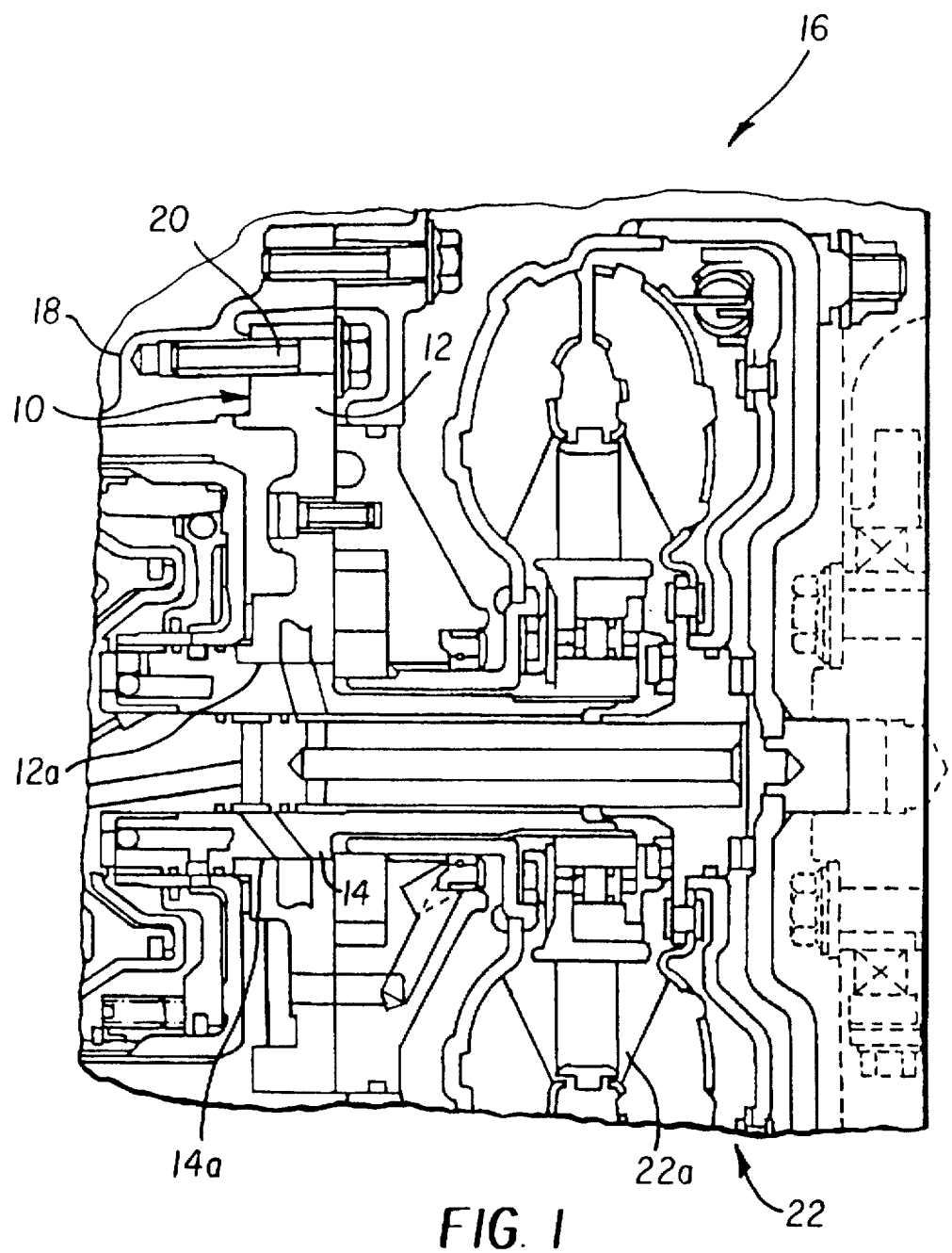
FIG. 1 is a view illustrating part of an automatic transmission according to the present invention.

FIG. 1 illustrates an oil pump cover according to the present invention.

An oil pump cover 10 includes a cover body 12 and a stator shaft 14. The cover body 12 is made of aluminum and has a hole 12a in its shaft center R. The cover body 12 is anchored to a casing 18 of an automatic transmission 16 with bolts 20.

The stator shaft 14 is made of iron and has a toothed part 14a in its tip end. The stator shaft 14 supports a stator 22a of a torque converter 22.

The stator shaft 14 is pressed at its tip end into a hole 12a in the cover body 12. Hereby, the toothed part 14a of the stator shaft 14 bites into the hole 12a in the cover body 12, so that the stator shaft 14 is securely united with the cover body 12 not only axially but also in the direction of rotation. As listed in FIG. 2, the cover body 12 is formed with one having a material quality of AC2B(aluminum alloy class 2 B for metal mold casting Japanese Industrial Standard), and is subjected over the surface of the hole 12a to a solution heat treatment at 500 centigrade degree for 3 hours and is tempered at 180 centigrade degree for 4 hours, whereby the cover body 12 acquires hardness of from 94 HB to 99 HB ("A" in FIG. 2).

Figures 2, 3:
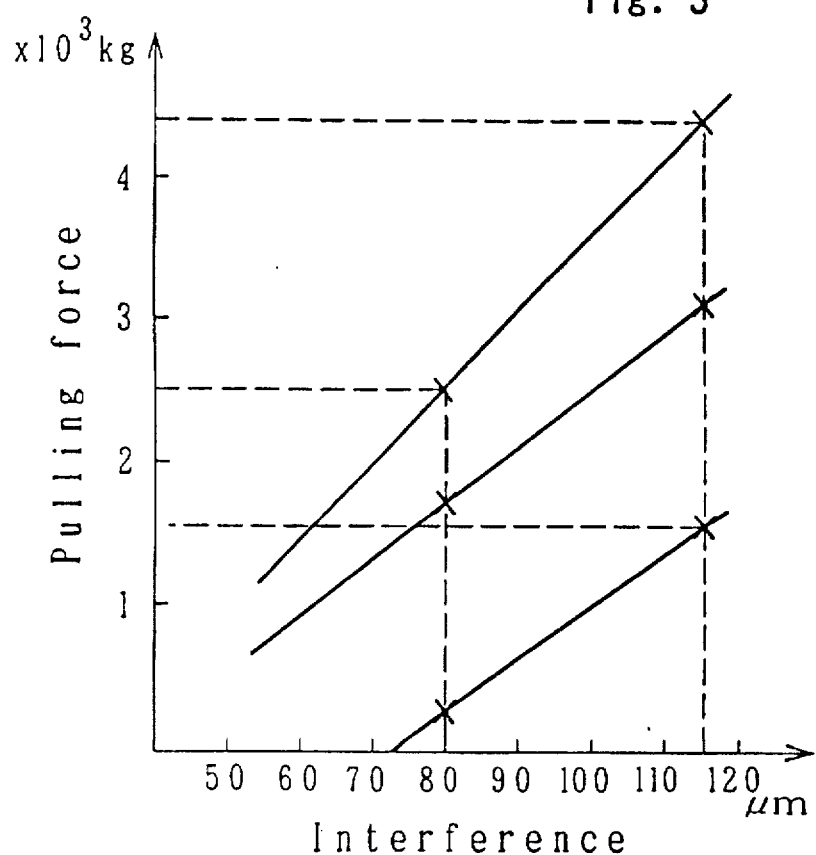
FIG. 2 is a table in which there are illustrated a relationship among material qualities of a cover body, conditions of a heat treatment and the degree of hardness.
FIG. 3 is a graphical representation in which there are illustrated relationships between pulling forces and interference between stator shaft and cover bodies listed in FIG. 2 at a general temperature of an automatic transmission rising when a vehicle is running.

On the other hand, a cover body shown by "C" in FIG. 2 which has the same material quality as that of the just-mentioned cover body 12 but which is left behind at ordinary temperature and is hardened through natural aging has hardness of from 68 HB to 69.5 HB (conventional cover body).

The cover body of "A" has greater hardness than that of "C" in such a manner, so that the cover body of "A" has smaller plastic deformation than that of "C" when the stator shaft is pressed into the holes.

FIG. 3 illustrates relationships between pulling forces and interference between the stator shaft 14 and the cover body 12 at a general rising temperature of an automatic transmission 16 when a vehicle is running.

When the interference is 80 μm for example, the pulling force is $2.5 \times 10^3$ kg in "A" and $0.3 \times 10^3$ kg in "C". The cover body "A" therefore has the pulling force about 9 times that of "C". Further, when the interference is 115 μm for example the pulling force is $4.5 \times 10^3$ kg in "A" and $1.4 \times 10^3$ kg in "C". The cover body "A" therefore has the pulling force about 3 times that of "C".

The cover body "A" has the pulling force about 3 to 9 times that of "C" at a temperature where the automatic transmission 16 ordinarily rises when a vehicle is running, therefore the stator shaft 14 is prevented from being axially displaced or rotated.

It is therefore unnecessary to increase the interference allowance between the stator shaft and the hole in the cover body on the assumption that the actual interference is reduced to cause the stator shaft 14 being axially moved when the automatic transmission 16 becomes a high temperature. Thus, there is eliminated the need where the stator shaft 14 is pressed into the hole 12a in the cover body 12 while overheating the hole 12a in the cover body 12 and simultaneosuly supercooling the stator shaft 14. This simplifies the manufacturing process of the oil pump cover.

In the following a second embodiment will be described.

A cover body 12 is formed with a material having a quality of AC4B (aluminum alloy class 4B, Japanese Industrial Standard) listed as "B" in FIG. 2, and is subjected at the surface over a hole 12a to a solution heat treatment at 525 centigrade degree for 6 hours and is tempered at 160 centigrade degree for 6 hours whereby the cover body 12 acquires hardness of from 74 HB to 84 HB.

The cover body of "B" has greater hardness than that of "C" so that the pulling force can be increased as in the first embodiment.

As illustrated in FIG. 3, even at a temperature which the automatic transmission 16 has when a vehicle is running, pulling force of "B" with the interference being 80 μm for example is $1.7 \times 10^3$ kg, about 6 times that of "C", and pulling force of "B" with the interference being 115 μm for example is about $3.0 \times 10^3$ kg about 1.5 times that of "C".

The cover body of "B" therefore has the pulling force about 1.5 to 6 times that of "C", so that the second embodiment can demonstrate the identical effect as that of the first embodiment. According to the present invention, the hole in the cover body has smaller plastic deformation when the stator shaft is pressed thereinto, so that the stator shaft is substantially prevented from being displaced axially even at a high temperature. Accordingly, since a necessary amount of the interference between the stator shaft and the cover body is secured even at a high temperature, it is unnecessary when the stator shaft is pressed into the hole in the cover body to increase the interference allowance therebetween on the assumption that the interference is reduced at the high temperature. This can simplify the manufacturing process of the oil pump cover.

Further, provided hardness of the hole in the cover body is set to be 90 HB or more, the plastic deformation of the cover body is particularly reduced when the stator shaft is pressed into the cover body, so that a predetermined amount or more of the interference between the stator shaft and the cover body is ensured.

Furthermore, when the surface of the hole is subjected to a solution heat treatment at 500 centigrade degree for 3 hours and is tempered at 180 centigrade degree for 4 hours the hole in the cover body acquires hardness of 90 HB or more, so that plastic deformation of the stator shaft when the stator shaft is pressed into the hole in the cover body is reduced.

What is claimed is:

1. An oil pump cover including an aluminum cover body fixed to a casing of an automatic transmission and having a hole formed in a shaft center thereof and an iron stator shaft being pressed into said hole in said cover body, the improvment comprising:

said stator shaft is pressed into said hole in said cover body after a surface of said hole is hardened;

wherein a hardness of the surface of said hole in said cover body is 90 HB or more; and wherein the surface of said hole in said cover body is formed with aluminum alloy class 2B (AC2B) for metal mold casting, and is subjected to a solution heat treatment at 500 centigrade degree for 3 hours and is thereafter tempered at 180 centigrade degree for 4 hours.

2. An oil pump cover comprising:

an aluminum cover body fixed to a casing of an automatic transmission, said cover body including a surface hardened hole formed in a shaft center thereof, and a press fit iron stator shaft for supporting a stator of a torque converter located in said hole;

wherein the surface of said hole in said cover is formed with aluminum alloy class 2B (AC2B) for metal mold casting, and is subjected to a solution heat treatment at 500 centigrade for 3 hours and is thereafter tempered at 180 degrees centigrade for 4 hours.

* * * * *